United States Patent [19]

Dorrego

[11] 4,016,843
[45] Apr. 12, 1977

[54] IGNITION DEVICES FOR AUTOMOBILES

[75] Inventor: Juan Antonio Castaños Dorrego, Madrid, Spain

[73] Assignee: Fabrica Espanola Magnetos, S.A., Madrid, Spain

[22] Filed: May 23, 1975

[21] Appl. No.: 580,336

Related U.S. Application Data

[63] Continuation-in-part of Ser. No. 461,918, April 18, 1974, abandoned.

[30]  Foreign Application Priority Data

Feb. 20, 1974  Spain .................................. 423432

[52] U.S. Cl. ........................ 123/117 R; 123/32 EA
[51] Int. Cl.[2] ........................ F02P 5/04; F02B 3/00
[58] Field of Search ....... 123/117 R, 32 EA, 148 E, 123/146.5 A

[56]  References Cited

UNITED STATES PATENTS

| | | | |
|---|---|---|---|
| 3,752,139 | 8/1973 | Asplund ......................... | 123/117 R |
| 3,799,136 | 3/1974 | Korteling ....................... | 123/117 R |
| 3,811,420 | 5/1974 | Vogel ............................. | 123/117 R |
| 3,890,944 | 6/1975 | Werner et al. .................. | 123/117 R |

Primary Examiner—Ronald B. Cox

[57]  ABSTRACT

The present invention relates to improvements in electronic control for the ignition advance for automobiles. The purpose of the present invention is to provide, on the basis of a given control signal, an advance in the relation between the firing point of the spark and top dead center in the cylinder, as a function of an advance curve by known means such as centrifugal, manifold vacuum, position of the throttle butterfly or of other parameters (engine temperature, ambient temperature, etc...).

3 Claims, 10 Drawing Figures

IGNITION DEVICES FOR AUTOMOBILES

REFERENCE TO RELATED APPLICATIONS

This application is a continuation-in-part of my co-pending application Ser. No. 461,918 filed Apr. 18, 1974, now abandoned, and is related to application Ser. No. 522,849, filed Nov. 11, 1974, now abandoned.

BACKGROUND OF THE INVENTION

It is known that the spark does not jump precisely at the end of compression, when the piston reaches top dead centre, and that a certain advance is necessary, or on occasions a lag of the ignition with respect to the said top dead centre, due to the fact that the explosion of the mixture is not instantaneously propagated in the chamber or cylinder.

Logically the greater the speed of the engine, the greater should be the advance angle of the ignition. This is shown by way of example in a centrifugal advance curve in FIG. 8.

In the same manner, it is also known that the firing is propagated at a higher speed if the mixture is highly compressed, that is to say, if the filling of the cylinder is completed, due to the fact that the throttle is fully open. A lesser degree of advance would be required wih the throttle in an intermediate position giving a less rich mixture. This also is shown by way of example in FIG. 10.

Therefore it is a question of attaining the optimum degree of advance in relation to the foregoing variables, limiting this to the centrifugal and manifold vacuum advance, and position of the throttle butterfly, consequently rendering the device fully automatic.

The following description of the disclosed invention is given by way of example.

It is assumed that the crankshaft speed (and thus the piston position) is given by the output of a distributor pick-up (or better by a crankshaft pick-up) which provides an electrical signal in the form of a square wave having a fixed duty cyle. This should ideally be of the optical type but can be of a type using variations in magnetic flux or of other known types.

The signal given by the pick-up or transducer follows:

$$d = r/T$$

where $d$ is the duty cycle, $r$ is the pulse width and $T$ is the period between pulses. It will provide two or more pulses for each crankshaft revolution, in the case of four cycles engine having four or more cylinders (four or more pulses for each distributor revolution). In FIG. 9 an ideal electrical output signal from a transducer as the heretofore described in shown, also the output signal of the invention described is shown as being generated under ideal conditions (constant velocity, normal ambient temperature, etc.).

DESCRIPTION OF THE INVENTION

In the block diagram shown in FIG. 1, it can be clearly seen the various functions of the elements forming this invention. The blocks 10 and 20 form a means whereby a continuous electrical signal is obtained directly proportional to the period between the pulses in each moment. One of the possible forms of realizing this object is by means of a squaring circuit, a ramp generator, a reset to zero circuit and a peak detector, which will be explained later. However, with the object of obtaining greater precision a circuit shown as block 30 can be used, which takes a sample of the output signal (S.10) from the ramp generator (10) and S.20 from the peak detector (20) and amplifies a portion of the total period time in such a way as to provide greater precision in the relationship voltage/period.

The signal S.20 from the peak detector carries crank or distributor speed information to actuate three function generators, the first being represented by block 40 the second by block 50, and the third by block 60. The circuit represented by block 40 generates a non linear function in such a way that the obtained advance curve is of the type shown in FIG. 8, without having feedback. This curve depends on the design and type of the engine. The function of this circuit 40 will be explained in greater detail later. The group formed by 50 and 60 give an output signal S.60 which drives block 70 which is a signal correcting device capable of modifying the information given by S.40 to the said circuit, with the object of obtaining optimum functioning of the spark advance. The block 80 is a comparator of the signals giving a further signal S.80 when S.70 and S.30 are equal. The signals S.31 and S.80 are fed to a triggering generator, represented by block 90, which has a protection circuit for operation at low engine speeds. The invention will be described by way of an example and for this, it will be clear with reference to the drawings, where:

DESCRIPTION OF THE PREFERRED EMBODIMENT

Figure 1:
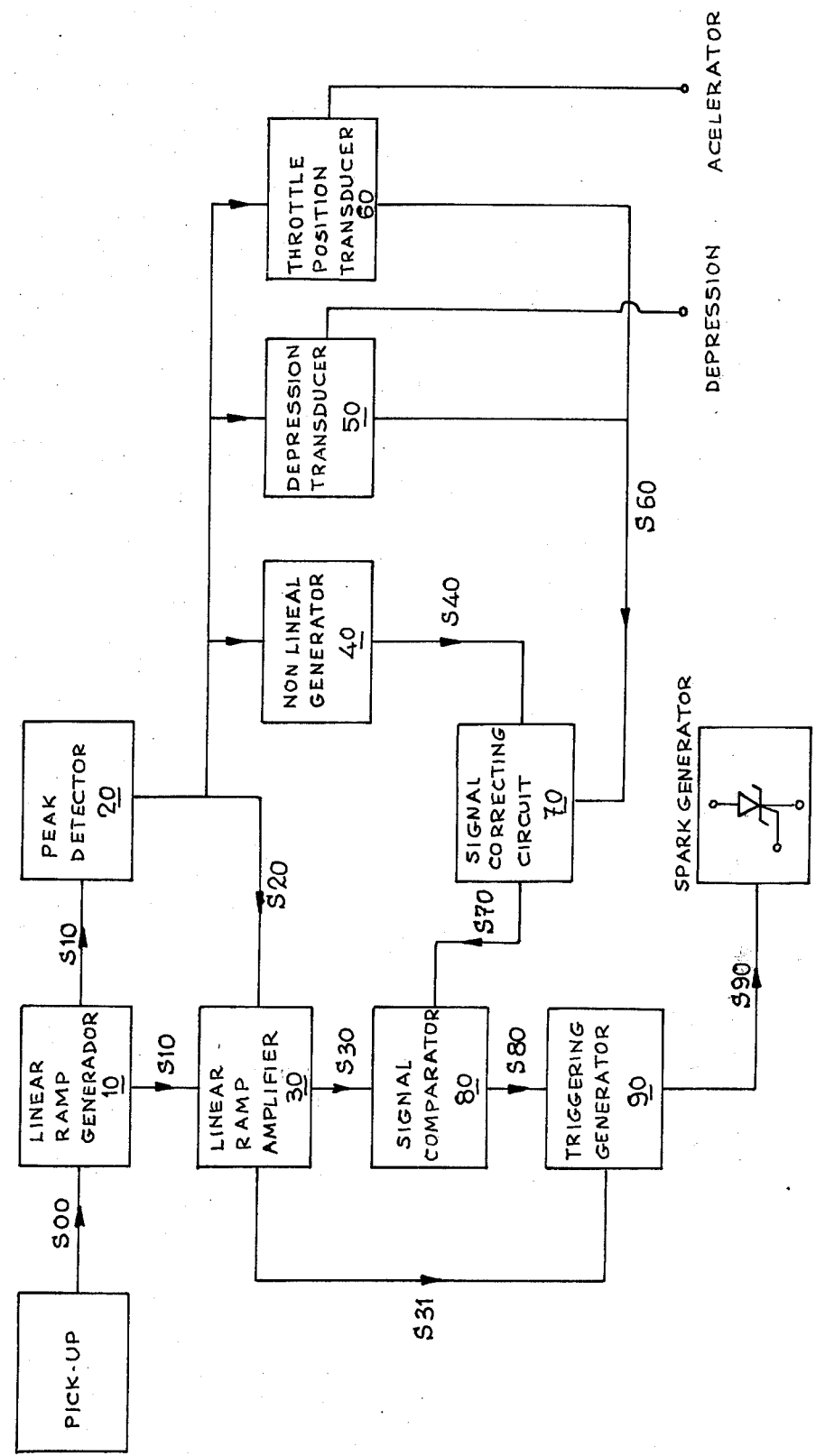
FIG. 1 is a block diagram of the present invention.
Figure 2:
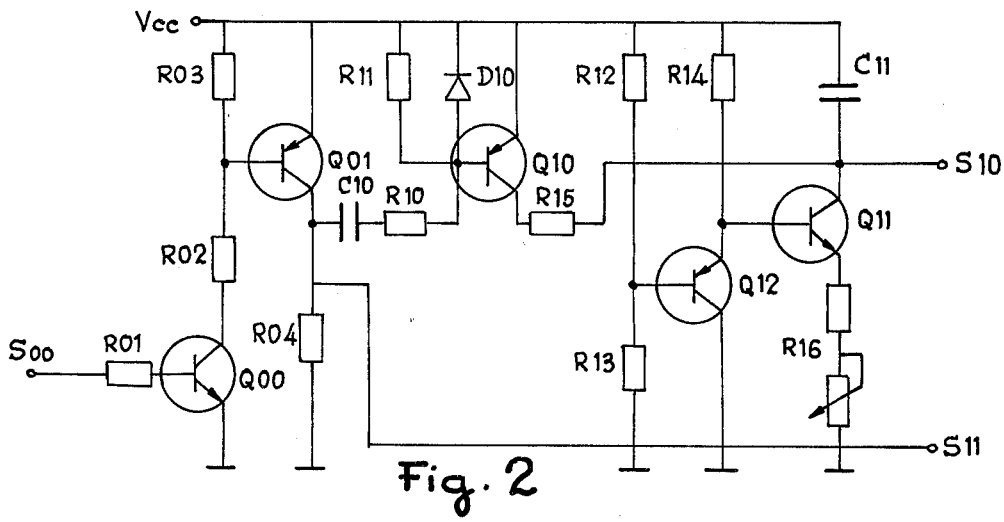
FIG. 2 is a detailed circuit of the linear ramp generator, having a constant slope (block 10 or block 30 if S.10 is inverted and substituted by S.30, S.11 is inverted and substituted by S.31).

With reference to FIG. 1, the input signal S00 to the linear ramp generator 10 from the pick up, is connected to the base of the transistor Q00 (FIG. 2) through the resistance R01, Q00 in turn drives Q00, R02, R03, Q01, R04, which executes the function of squaring and amplifying said signal S00. The resulting signal S11 actuates therefrom on the peak detector 20. The voltage divider R12, R13 gives a voltage which, via the transistor Q12, is taken to the emitter of the transistor Q11, giving a constant current across R16.

Consequently, the capacitor C11 charges at constant current, adjustable via R16, until it reaches the reset condition by the transistor Q10 and R15. This transistor is driven by a negative pulse proceeding from the signal S11 differentiated by C10, R10, R11, D10. Consequently the output signal S10 is a negative going ramp signal having a constant slope and with its amplitude directly proportional to the period between impulses in the input signal S00.

Figure 3:
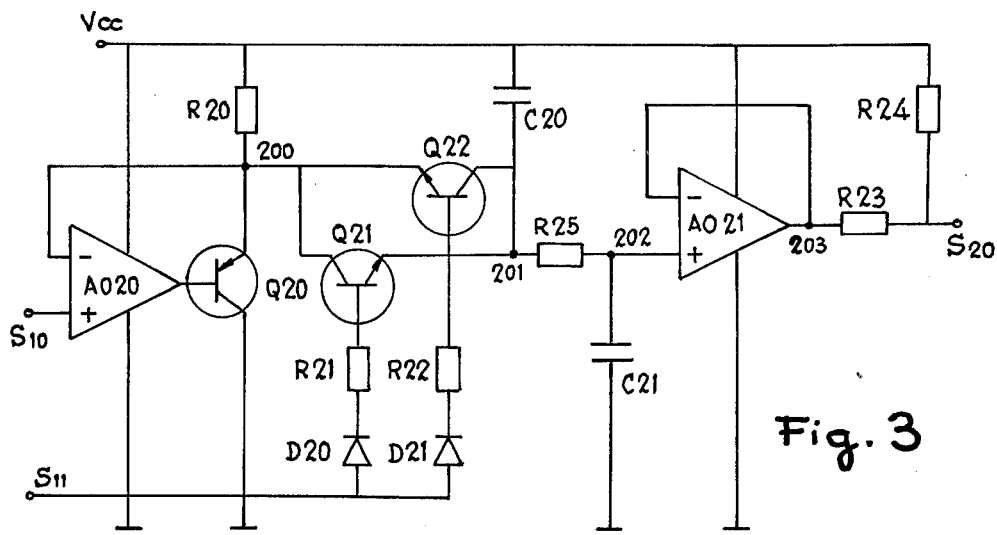
FIG. 3 shows a circuit of the peak detector (block 20).

The signals S10 and S11 are fed to block 20 (FIG. 3), in which the operational amplifier A020 operated as a simple follower and at the point 200 of the resistance R20 a signal identical to S10 will be present. When the bases of the transistors Q21, Q22 through R21, R22, D20 and D22 receive the signal S11 one or the other will conduct depending on the voltage conditions at the point 201 of capacitor C20, with respect to S10. In short, if the voltage at 201 is greater than that at point 200, transistor Q22 will conduct, whereas in the opposite case Q21 will do so.

In this way the voltage 201 is the negative peak voltage with reference to Vcc of the signal S10. The voltage at point 202 has the same value as at 201, but with less ripple. The operational amplifier A021 working as a follower carries this voltage to the point 203. The voltage divider network R23 and R24 serve to take a sample of said signal, at point 203 and gives a further output signal S20.

With the signals S20 and S10, employing a conventional comparator (such as an operational amplifier without feedback), a squared control signal is obtained which actuates a circuit 30 analogous to that shown in block 10 (FIG. 1) but with its outputs inverted to obtain the amplifier signals S30 and S31 corresponding to said block 30 (FIG. 1). The signal S30 obviously is one positive-going saw tooth or ramp with constant slope having variable amplitude, depending on the period between pulses of the signal S00. This constant slope signal maintains its reset conditions during a predetermined fraction of the period, this fraction being determined by the relation between resistors R23 and R24.

Figure 4:
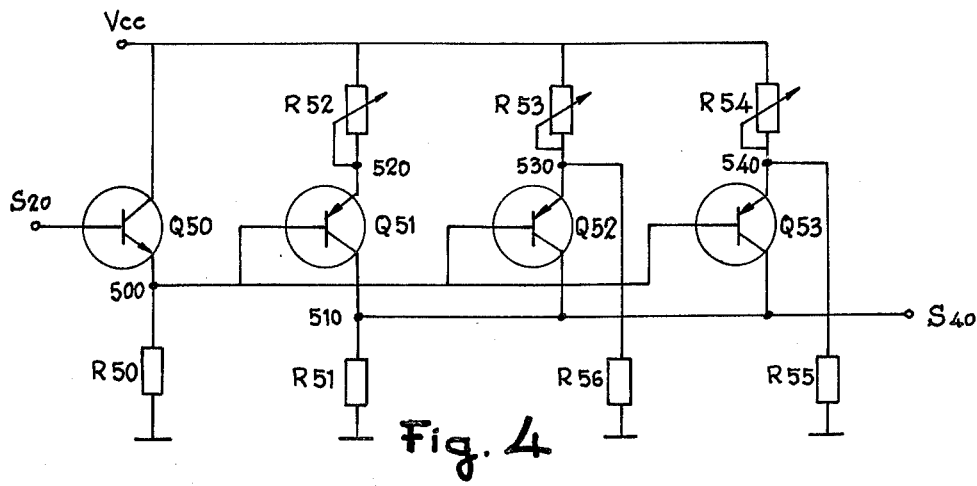
FIG. 4 shows a circuit of the non-linear generator without feedback (block 40).
Figure 8:
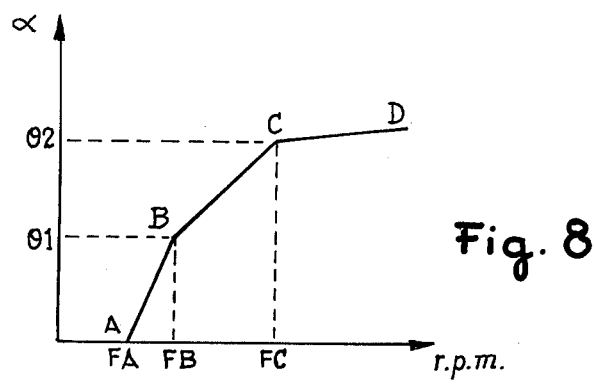
FIG. 8 is an illustration showing a possible advance curve.
Figure 9:
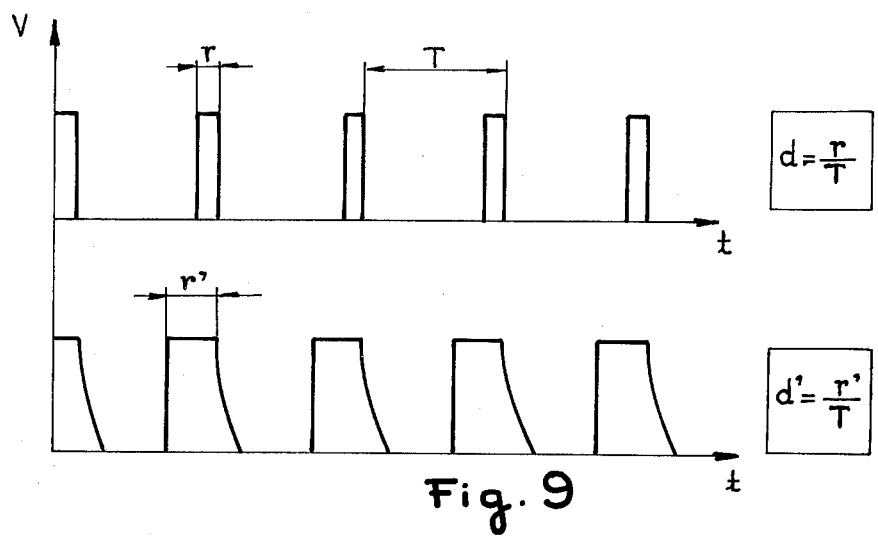
FIG. 9 is a diagram showing an optimised input and output signal relative to this invention.
Figure 10:
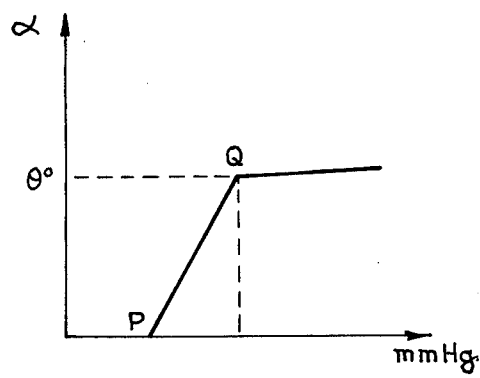
FIG. 10 is an illustration showing a typical manifold vacuum advance curve.

FIG. 8, as said, shows a typical centrifugal advance curve. In FIG. 4, a non linear generator without feedback is shown, which obtains the previously mentioned curve shown in FIG. 8. The section CD of this curve is obtained by means of the network Q50, Q51, R50 and R51. For whatever value of maximum centrifugal advance angle, (in this case, by way of example $\theta_2$) it is sufficient to adjust the value of R52 because Q51 actuates as a current generator, and Q50 is an impedance adaptor. The transistors Q52 and Q53 operate consecutively as S20 decreases as current generators in the same way as Q51. The point at which they commence operation is determined by the extremes C and B of the section BC of the curve shown in FIG. 8, and are also adjusted by means of the resistors R53, R56, R54 and R55, to obtain at the points 530 and 540 adequate polarizing voltages. In this manner the output signal S40 carries centrifugal advance curve information. The circuit shown by block 50 (FIG. 1) simulates the action of manifold vacuum and block 60 simulates to throttle butterfly position.

Figure 5:
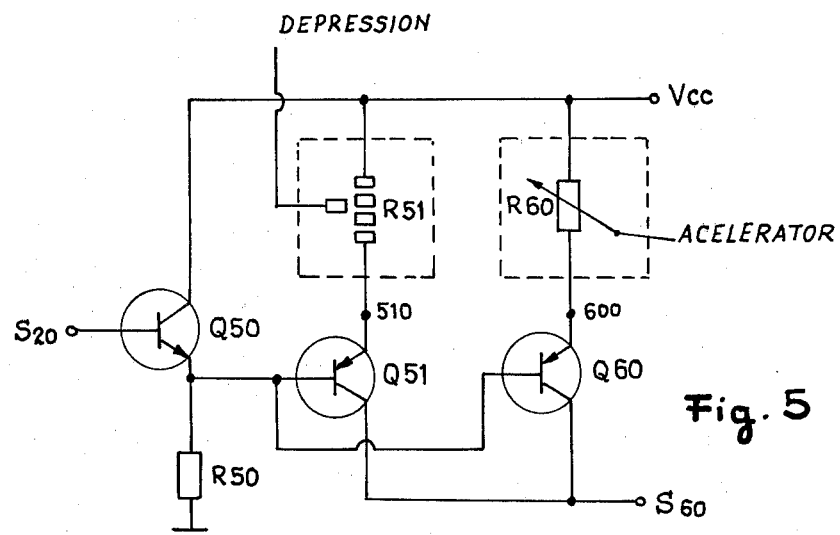
FIG. 5 is a detailed drawing showing the action of manifold vacuum and throttle butterfly position on the degree of advance.

The FIG. 5 shows a circuit in which a combination of block 50 and 60 may be realized. In the block 50 a non-linear vacuum transducer and in block 60 a throttle position transducer are illustrated. The signal S20 is conducted via the transistor Q50 which functions as an emitter follower, to the bases of transistors Q51 and Q60, which in turn function as current generators. Then it is evident that the signal S20 is almost the same at points 510 and 600. The potentiometer R51, represents the action of the vacuum transducer. This transducer must be non-linear and then adequate to obtain directly the manifold vacuum advance curve wanted. It can be continuous, but preferably will be non continuous and programmable (changing a plurality of resistors). An example of this kind of transducer may be seen in U.S. patent application Ser. No. 459,264. On the other hand the potentiometer R60 represents the throttle position transducer which can be analogous to R51. Variations in the position of the accelerator are translated into changes of resistance in R60. In short both Q51 and Q60 actuate as current generators, each one giving a current which is independently programmed in each transducer, and in turn does not depend on the engine speed. Consequently S60 is a current signal.

Figure 6:
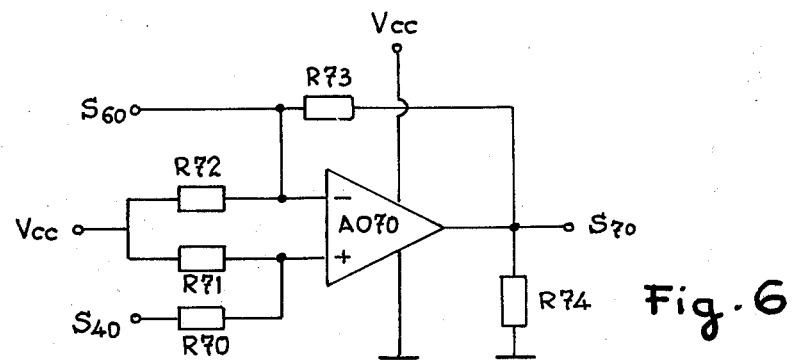
FIG. 6 is a detailed circuit showing the signal correcting device shown by block 70 in FIG. 1.

FIG. 6 represents the signal correcting circuit forming the block 70, which will be explained in the following manner: Supposing that the signal S60 has a zero value or does not exist, then the signal S40 is taken through R70 to the non inverting input of the operational amplifier A070. This input is connected via R71 to the positive supply voltage Vcc. The inverting input of said A070 is connected to its output via a feedback resistor R73 and to the positive supply voltage Vcc via another resistor R72. Resistor R74 forms the load. In this condition, and with an adequate relation between resistors the output voltage S70 is very closely equal to the input voltage S40. This configuration is perfectly adequate in spite of A070 being supplied between positive voltage and ground. If the current signal S60 does not have a zero value, the output signal S70 will be modified according to the current supplied at S60. In this way, the output signal S40 from the non-linear generator which is in accordance with the centrifugal advance curve (FIG. 8) is modified by the circuit 70 to S.70 which is not only in accordance with the centrifugal curve but also in accordance with the other two variables.

The comparator (block 80 FIG. 1) is of an already known type familiar to those skilled in the art. This comparator is of the same type used to obtain the control signal of the block 30 (FIG. 1). Circuits of these devices can be encountered, for example in the following books: "Operational Amplifiers. Designs and Applications". Graeme Tobey and Huelsman. Burn Brown and McGraw-Hill., and also in "Amplificateur Operationnel et ses Aplications". J. G. Marchais. Ed. Masson et cie. Paris.

Figure 7:
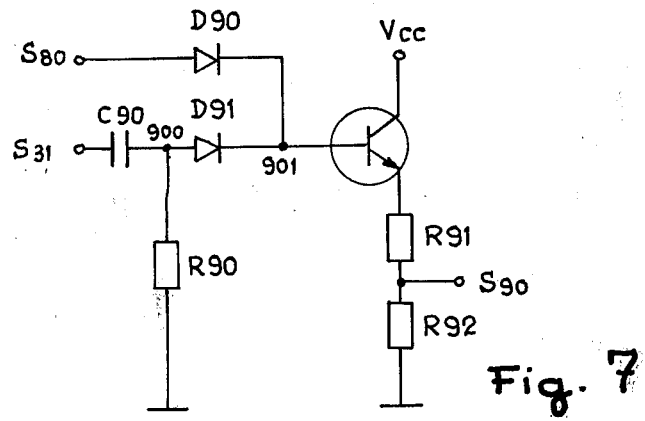
FIG. 7 is a circuit diagram showing the triggering generator (block 90).

This circuit could equally be a simple operational amplifier, having each of its inputs connected to S30 and S70 respectively, in such a manner that the output S80 changes when inputs S30 and S70 are equal. The output signal S80 is obviously a square pulse, whose width represents the number (in degrees) of the required advance, and when the operating conditions of the engine do not require an ignition advance (as shown by the section 0A of the curve in FIG. 8) the pulse width is zero. To prevent elimination of the spark generating pulse, a logical summing triggering circuit (block 90 FIG. 1) is used, the circuit of which is shown in FIG. 7. This circuit is a simple OR gate, having, at the point 901 the logical sum of signals S80 and S31. The signal S31 is a square pulse from the block 30 and the network C90, R90 forms a differentiator and diodes D90 and D91 are the summing devices. Therefore, when the output signal S80 is zero, the output of the OR gate is S31 which triggers the spark with zero advance. This signal S90 may actuate the gate of a thyristor, triggering it with the pulse leading edge, or may trigger other adequate device.

What is claimed is:

1. An electronically controlled ignition system for obtaining optimum spark advance comprising:
   a. a transducer means which continuously monitors engine speed and generates electrical pulses having a frequency proportional to the engine speed;
   b. a first ramp generating means for translating said electrical pulses to a first electrical signal having constant slope and an amplitude proportional to the period between said electrical pulses;
   c. a peak detecting means for sampling said first electrical signal, detecting the peak voltage thereof, and emitting a second electrical signal carrying engine speed information in the form of a squared signal;
   d. a non-linear function generator means having stored therein predetermined optimum spark advance information relative to engine speed for sampling and modifying said second electrical signal to emit a third electrical signal having therein said peak voltages adjusted by said predetermined spark advance information;
   e. a signal comparing means for comparing said first and third electrical signals and emitting a fourth signal in the form of a pulse at such times as the voltages of the first and third electrical signals are equal; and
   f. a spark generating means activated responsive to said fourth signal.

2. The ignition system according to claim 1 and further comprising a second, non-linear function generator means having stored therein predetermined optimum spark advance information relative to manifold vacuum for further sampling said second electrical signal and modifying said third signal emitted by said first function generator means, whereby said third signal includes peak voltages adjusted by said predetermined spark information relative to both engine speed and manifold vacuum.

3. The ignition system according to claim 2, and further including a third, non-linear function generator means having stored therein predetermined optimum spark advance information relative to throttle position for further sampling said second electrical signal and modifying said third signal emitted by said first function generator means, whereby said third signal includes peak voltages adjusted by said predetermined spark advance information relating to engine speed, manifold vacuum, and throttle position.

* * * * *